(No Model.) 4 Sheets—Sheet 1.

D. GROVE.
APPARATUS FOR HEATING BAKING COMPARTMENTS OR COOKING VESSELS, &c.

No. 443,516. Patented Dec. 30, 1890.

Witnesses:
E. R. Brown
E. L. Richards

Inventor:
David Grove
By Richards
Attorneys.

(No Model.) 4 Sheets—Sheet 2.
D. GROVE.
APPARATUS FOR HEATING BAKING COMPARTMENTS OR COOKING VESSELS, &c.
No. 443,516. Patented Dec. 30, 1890.
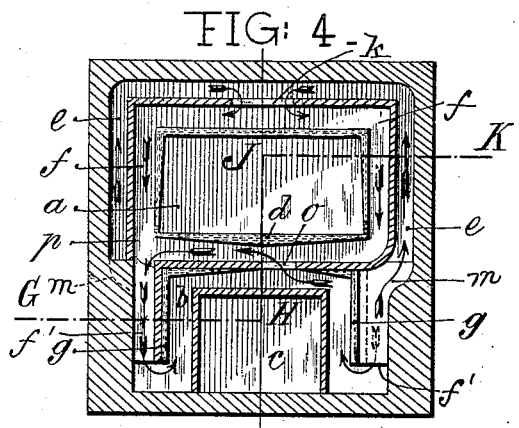
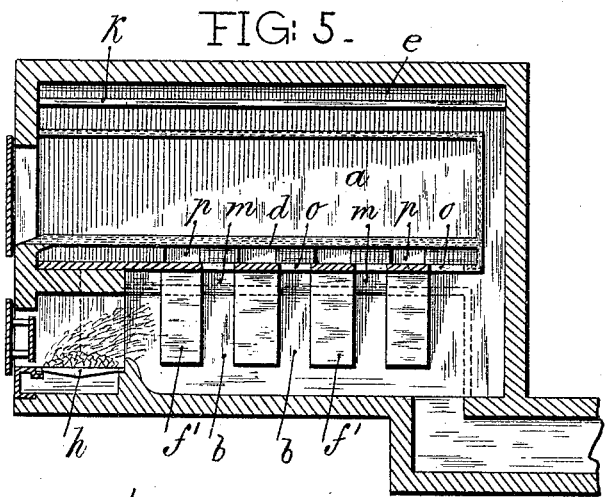
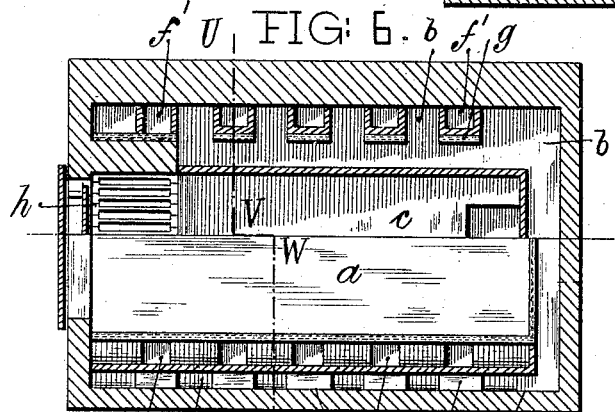
Witnesses:
E. R. Brown
E. L. Richards
Inventor:
David Grove
By Richardson
Attorneys.

(No Model.) 4 Sheets—Sheet 3.
D. GROVE.
APPARATUS FOR HEATING BAKING COMPARTMENTS OR COOKING VESSELS, &c.
No. 443,516. Patented Dec. 30, 1890.
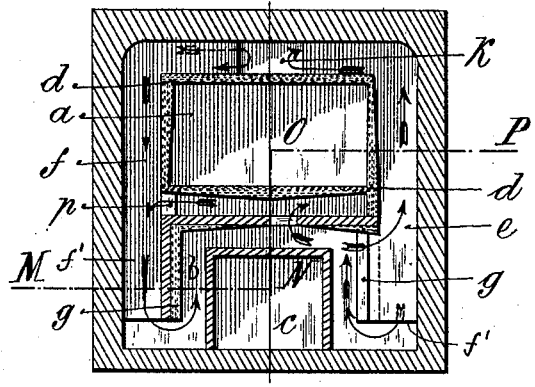
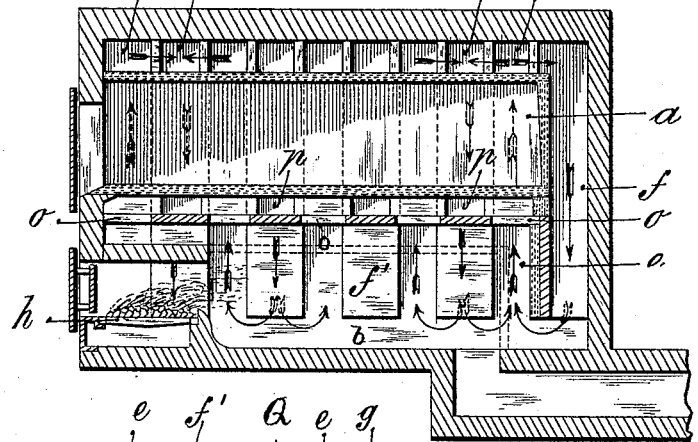
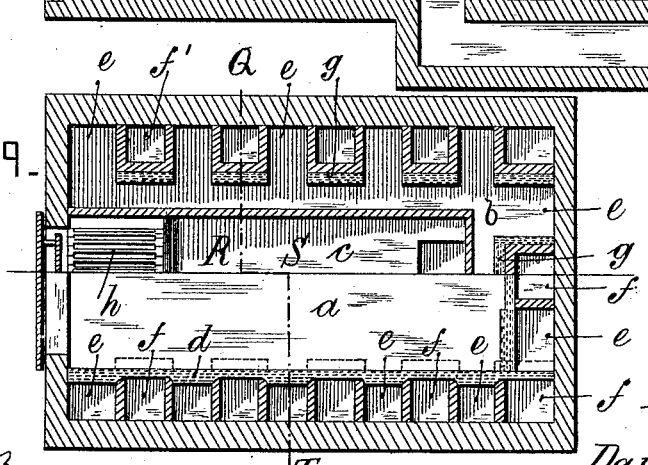
Witnesses:
E. R. Brown
E. L. Richards
Inventor:
David Grove
By Richards
Attorneys.

(No Model.) 4 Sheets—Sheet 4.

D. GROVE.
APPARATUS FOR HEATING BAKING COMPARTMENTS OR COOKING VESSELS, &c.

No. 443,516. Patented Dec. 30, 1890.

Witnesses:
E. R. Brown
E. L. Richards

Inventor:
David Grove
By Richards &
Attorneys.

UNITED STATES PATENT OFFICE.

DAVID GROVE, OF BERLIN, GERMANY.

APPARATUS FOR HEATING BAKING-COMPARTMENTS OR COOKING-VESSELS, &c.

SPECIFICATION forming part of Letters Patent No. 443,516, dated December 30, 1890.

Application filed January 15, 1889. Serial No. 296,423. (No model.) Patented in England January 19, 1884, No. 1,780, and June 3, 1886, No. 7,454.

*To all whom it may concern:*

Be it known that I, DAVID GROVE, of No. 24 Friedrich Strasse, in the city of Berlin, in the Empire of Germany, have invented a certain new and useful Apparatus for Heating Baking-Compartments or Cooking-Vessels by a Continuous Current of Heated Air, (patented in Great Britain January 19, 1884, No. 1,780, and June 3, 1886, No. 7,454,) of which I declare the following to be a specification.

My invention relates to an improved apparatus for heating baking-compartments or cooking-vessels by a continuous current of heated air, the baking or cooking operation being effected by means of superheated air supplied by an air-heating chamber in such manner that the heated air is caused to circulate around the baking or cooking compartments or vessels, communicate its warmth to the same, and descend to the air-heating chamber surrounding the calorifier or heater, where it is again heated and recirculates around the aforementioned baking or cooking compartments or vessels. In this manner a perfectly equable heating of the entire baking or cooking compartment is attained, and as the products of combustion do not come in contact with the baking or cooking vessel the latter can be continuously heated without the said compartments or vessels being heated higher at one point than the other. The walls of the baking-compartments can be partially coated with non-conducting material, which is thickest at that part where the hot air has the highest temperature and decreases in thickness from this point.

In the accompanying drawings I have represented the application of my invention for baking and cooking purposes.

Figure 1:
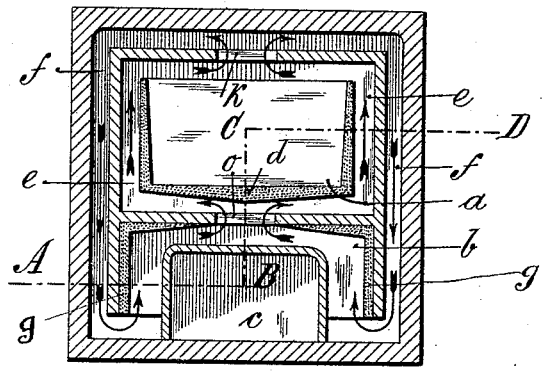
Figure 2:
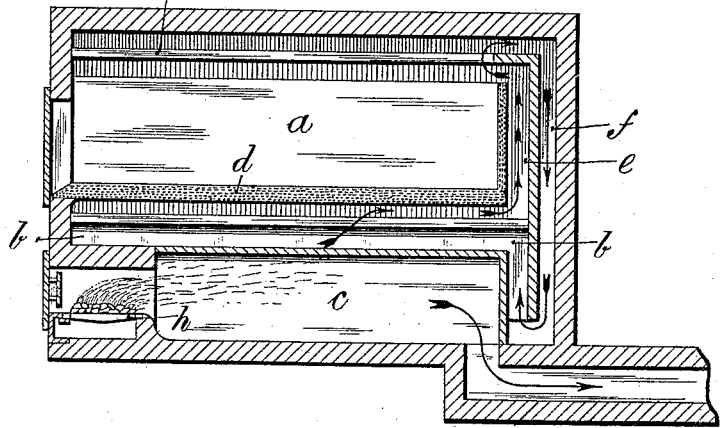
Figure 3:
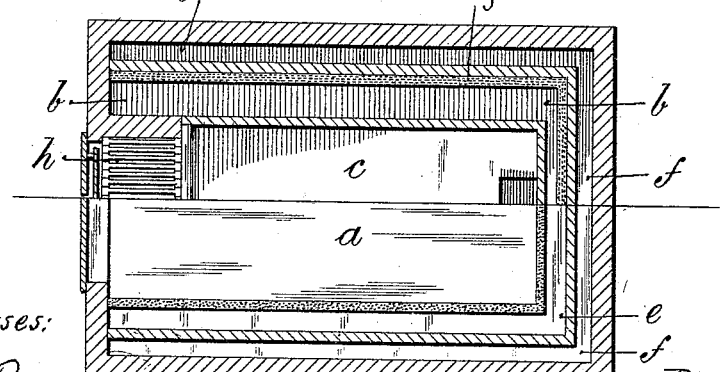
Figure 10:
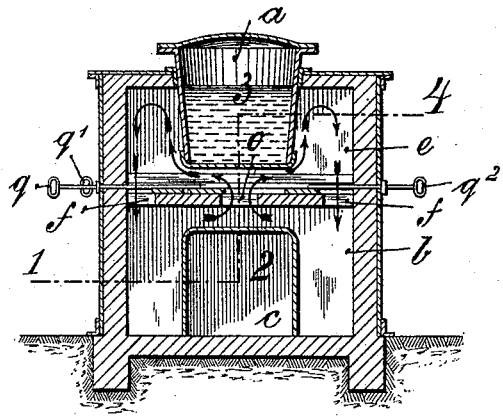
Figure 11:
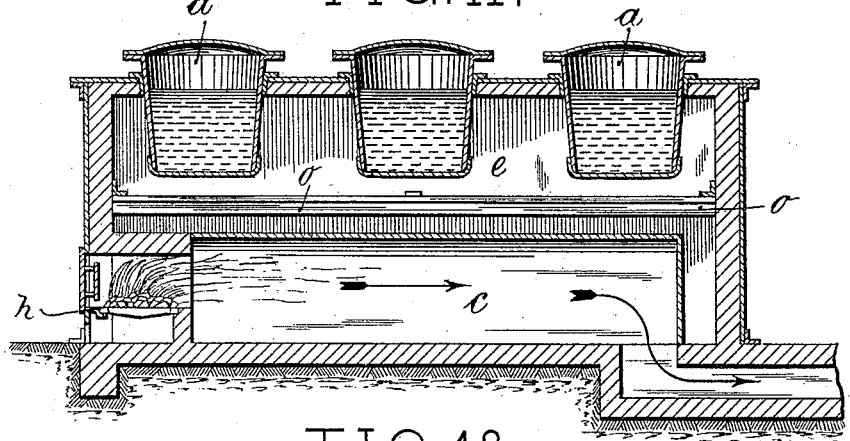

Figure 1 is a vertical cross-section; Fig. 2, a vertical longitudinal section; Fig. 3, a horizontal section on the line A B C D in Fig. 1. Fig. 4 is a vertical section on the line U V W X in Fig. 6 of a modified form of baking-oven. Fig. 5 is a vertical longitudinal section with the combustion-chamber broken away and indicated only by dotted lines. Fig. 6 is a horizontal section on the line G H J K in Fig. 4. Fig. 7 is a vertical section on the line Q R S T in Fig. 9. Fig. 8 is a vertical longitudinal section with the combustion-chamber removed and indicated only by dotted lines. Fig. 9 is a horizontal section on the line M N O P in Fig. 7. Fig. 10 is a vertical section of another modification of my invention applied to a cooking apparatus. Fig. 11 is a vertical longitudinal section, and Fig. 12 a horizontal section on the line 1 2 3 4 in Fig. 10.

$a$ is the baking-compartment or cooking-vessel, beneath which the air-heating chamber $b$ is arranged, the air in which is heated by a suitable furnace with grate $h$ and heater or combustion-chamber $c$. The products of combustion pass through the said combustion-chamber or heater $c$ into the chimney. The hot air in the heating-chamber $b$ ascends through the opening $o$ beneath the baking or cooking compartment or vessel $a$ and is distributed in the ascending canals $e$, which run around the baking-compartment.

When the hot air has communicated its heat to the baking-compartment, it passes through the opening $k$ into the descending canals or channels $f$, Figs. 1, 2, and 3, descends in the same into the air-heating chamber $b$, where it is again heated, and is caused to circulate as aforedescribed.

The walls of the baking-compartments are clad with a non-conducting material $d$, which is thickest at those parts where the heated air has the highest temperature and gradually decreasing from this point, Figs. 1, 4, and 7.

The canals $f$, in which the cooled air descends, are protected against the heat radiating from the combustion-chamber $c$ by a layer of isolating material $g$, so that the contrary currents of air and eddies are prevented.

In the modification, Figs. 4, 5, and 6, the heated air flows through the lateral openings $m$ into the ascending canals or channels $e$ and through the opening $k$ into the descending canals $f$, surrounding the baking-compartment $a$. After having communicated its heat to the baking-compartment the cooled air descends through the openings $p$ in the top of the air-heating chamber $b$ into the canals $f'$, and from thence into the air-heating chamber $b$, where the same becomes again heated and circulates as aforedescribed. The lower surface of the baking-compartment is heated, as aforementioned, by the heated air from the air-heating chamber $b$, ascending through the opening $o$, which, after communicating its heat to the bottom of the baking-compartment $a$, descends again into the chamber $b$ through the canal $f'$. The walls of the baking-compartment are, as aforedescribed, clad with non-conducting material, the thickness of which varies according to the temperature of the air.

The canals $e$ and $f$ for the ascending heated and descending cooled air are represented side by side along the walls of the baking-compartment, Figs. 7, 8, and 9; but the air-circulation remains as above described, the heated air ascending through the opening $o$ and the canals $e$, passes at $k$ and $p$ into the canals $f$ and $f'$, and descends in the same into the air-heating chamber $b$.

I have represented only one baking-compartment in the accompanying drawings; but it will be evident that more than one such baking-compartment can be employed and that the same can be placed side by side or above each other.

Figure 12:
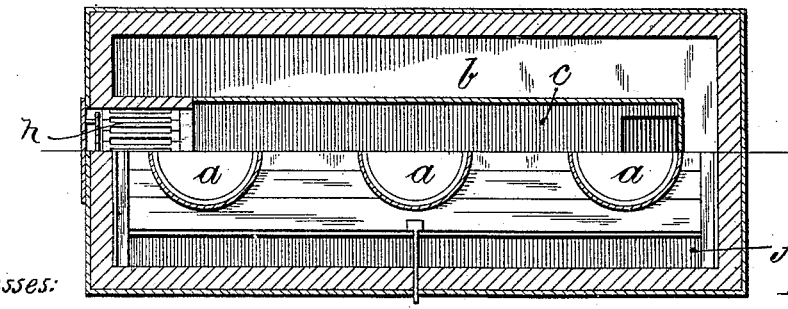

Figs. 10, 11, and 12 represent my invention applied to cooking-vessels. The hot air from the air-heating chamber $b$ ascends through the slots $o$ in the top of the horizontal wall which divides the air-heating chamber $b$ from the chamber $e$, in which the cooking-vessels are suspended, and, after circulating around the said cooking-vessels and communicating heat to the same, flows through the slots or openings $f$ in the aforenamed horizontal partition-wall, the hot air ascending through the slots $o$ immediately beneath the cooking-vessels $a$. In this manner the air is kept in continuous circulation, as mentioned in reference to the baking operation. The slots $o$ and $f$ are provided with slides $q\ q'\ q^2$, so that the size of the said slots or openings for the circulation of the air inclosed within the walls of the apparatus can be regulated according to requirement.

Having now particularly described and ascertained the nature of my said invention and in what manner the same is to be performed, I declare that what I claim is—

1. The combination of a calorifier or heater $c$, inclosed as described, an air-heating chamber around the same, an oven or cooking-compartment above the heater, and a hot-air chamber surrounding said compartment and having a passage for hot air from the said heating-chamber to the hot-air chamber and a separate passage for partially-cooled air from the hot-air chamber to the heating-chamber, all arranged to maintain a circulation of the same body of air around the cooking-compartment, substantially as set forth.

2. The combination of a heater inclosed as described, an air-heating chamber around the same, a hot-air chamber above said heating-chamber, a cooking-compartment in the heating-chamber, a series of channels leading from the upper part of the heating-chamber to the upper part of the hot-air chamber, and a separate series of channels leading from the lower part of the hot-air chamber to the lower part of the said heating-chamber, substantially as set forth.

3. The combination, with a hot-air chamber, of a cooking-compartment within the same, an air-heating chamber communicating with the hot-air chamber, the parts being arranged to produce a continuous circulation of the same body of air, and a non-conducting material $d$, of varying thickness, on said cooking-compartment, substantially as set forth.

4. The combination of a heater inclosed as described, an air-heating chamber around the same, a hot-air chamber above said heating-chamber, a cooking-compartment in the hot-air chamber, a series of channels leading from the upper part of the heating-chamber to the upper part of the hot-air chamber, and a separate series of channels leading from the lower part of the hot-air chamber to the lower part of the said heating-chamber, the latter channels being protected by non-conducting material $g$, substantially as set forth.

In witness whereof I have hereunto signed my name in the presence of two subscribing witnesses.

DAVID GROVE.

Witnesses:
KARL ROSSTENSCHER,
ANTHONY STEFFEN.